United States Patent

Field

[15] 3,642,353
[45] Feb. 15, 1972

[54] ADJUSTABLE MIRROR ASSEMBLY

[72] Inventor: Richard H. Field, Broomall, Pa.
[73] Assignee: Lasermation, Inc., Philadelphia, Pa.
[22] Filed: Oct. 2, 1970
[21] Appl. No.: 77,435

[52] U.S. Cl. .....................350/310, 74/89.15, 74/471 XY, 248/179, 248/481, 350/6
[51] Int. Cl. ...........................................G02b 7/18
[58] Field of Search......................350/6, 7, 285, 288, 310; 74/471 XY, 89.15; 248/179, 181, 481, 483

[56] References Cited

UNITED STATES PATENTS 3,350,048  10/1967  Talbot ..................................248/481
3,478,608  11/1969  Met.....................................350/310 X

FOREIGN PATENTS OR APPLICATIONS 466,976  3/1914  France..................................350/296

*Primary Examiner*—David Schonberg
*Assistant Examiner*—John W. Leonard
*Attorney*—Howson and Howson

[57] ABSTRACT

A mirror assembly suitable for use in reflecting a laser beam or any other light beam, in which the mirror can be positioned to rotate about a pair of orthogonal axes to the plane of the reflective surface of the mirror. The mirror is mounted on the front of a trunnion having spherical peripheral side surfaces which are journaled in the corresponding spherical bearing surfaces of a surrounding cap. The center of the sphere along which the spherical trunnion surfaces and the bearing surfaces lie is located at the intersection of the orthogonal axes at the reflecting surface of the mirror about which rotation of the mirror is desired. The spherical trunnion surfaces and the spherical bearing surfaces are urged together by means of a partially compressed wave spring acting between a shoulder on the trunnion and a capture ring secured to the front of the cap. The trunnion has a rearward extension within the cap which can be adjustably positioned rotationally about the center of the spherical surfaces by means of set screws extending through the cap and bearing against the sides of the extension of 90° from each other. The above-described unit is preferably secured together as an integral module, which in turn can be removably secured to a baseplate on a mirror corner support, with the mirror extending through an opening in the baseplate and corner support so as to be exposed to the laser beam. The front of the mirror is positioned forwardly of the remainder of the module so that it can readily be cleaned.

5 Claims, 9 Drawing Figures

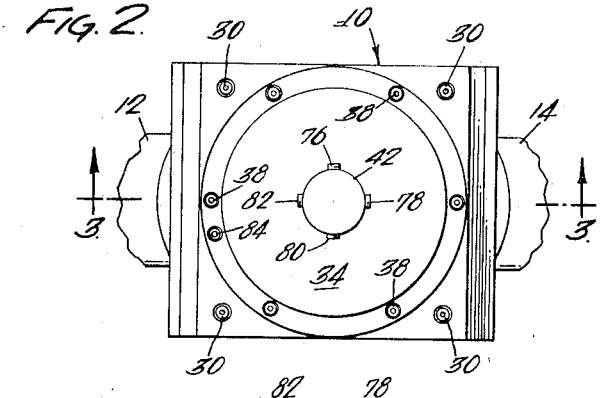
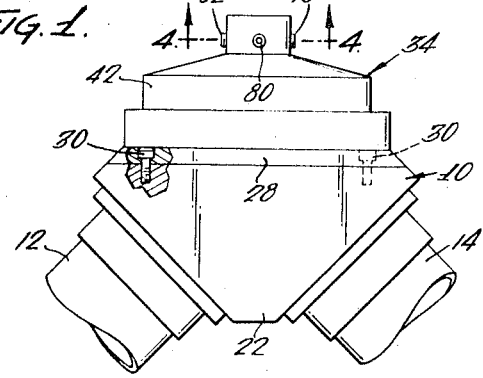
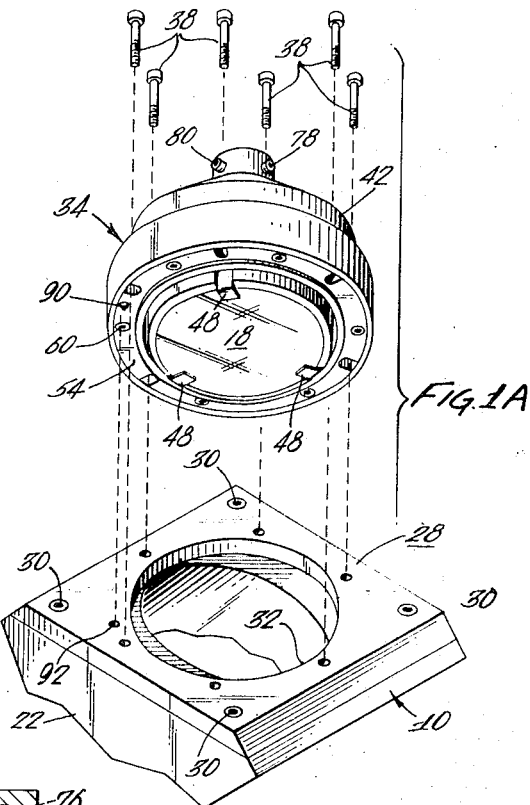
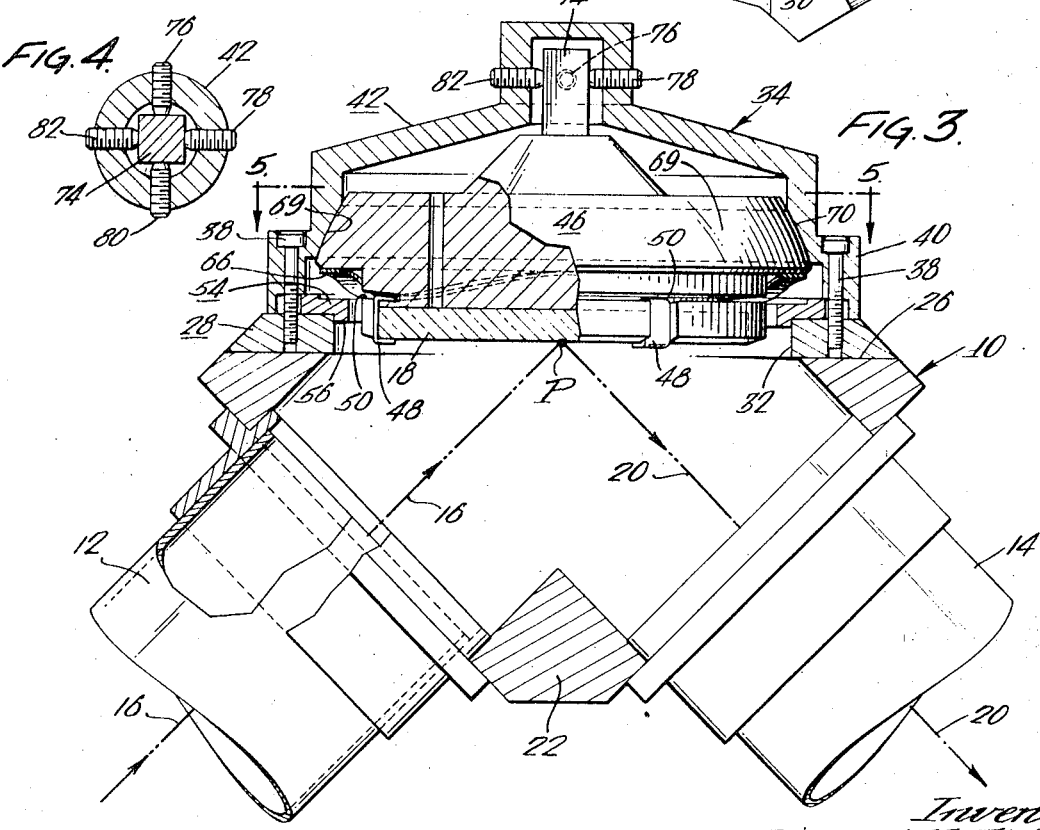

Inventor:
Richard H. Field
by Howson & Howson
Attys

ADJUSTABLE MIRROR ASSEMBLY

BACKGROUND OF THE INVENTION

There are a large variety of important applications in which it is desirable or necessary to support a mirror reflective of electromagnetic energy in a manner such that the angle of the mirror can be accurately adjusted. While such adjustable mirror arrangements have long been useful in experimental or commercial optical equipment utilizing ordinary light, they also find increasingly important use in the reflection of laser light. Such laser light is often utilized in the form of a narrow, highly collimated beam traveling from a source to a final target along a path which may include one or more reflections from mirrors. As an example only, in the machining of materials by impinging a laser beam thereon, it is known to place the workpiece upon a horizontal work table, to direct the beam along an X-direction parallel to the workpiece, to reflect it along a Y-direction at right angles to the X-direction and parallel to the workpiece by means of a first mirror, and then to direct the beam directly downwardly upon the workpiece by means of a second mirror, both mirrors providing rightangle reflection of the beam. The point at which the laser beam strikes the workpiece is in general critical, and will depend upon the exact angles of the mirrors, hence the angular positions of the mirrors must be very accurately adjusted.

In such laser-beam machining apparatus, the point of impingement of the beam upon the workpiece during use may be changed by appropriately moving the mirrors along the X- and Y-directions and arresting them at the positions which direct the beam to the desired point. In order to cause the beam to move quickly to different successive points on the workpiece, it is often important to move the mirrors rapidly between their corresponding positions, a process which inherently involves relatively high accelerations of the mirrors. In such cases it is also very important that the mirror support arrangements have high-mechanical stability, so that the angles of the mirror will not change in response to such accelerations or shocks.

It is also generally important that the mirror be enclosed in a light and environment impervious enclosure; in the case of conventional optical systems, this is normally to prevent entrance of stray light into the system, while in the case of a laser it is customary to enclose the beam as a safety measure, particularly in high-power laser systems. In both cases, it is desirable to exclude contaminating atmospheres from the mirror surface and adjusting mechanism. Also, in such cases it is highly desirable to be able to make adjustments of the mirror angle from the exterior of the light enclosure, rather than having to disassemble the system in order to get at the mirror for adjustment purposes.

Also generally important is a provision for cleaning the reflective surface of the mirror from time to time. This makes it desirable that the mirror mounting structure be in the nature of an integral module which can be removed relatively easily from the light enclosure on occasions when cleaning is required, and readily replaced. In this circumstance it is desirable that the mirror mounting arrangement be such that upon replacement the mirror assumes the same position which it had before its removal.

In connection with the cleaning operation, it is also desirable that the surface of the mirror to be cleaned be freely and openly accessible. For example, one typical method of cleaning such a mirror consists of wetting the mirror with a cleaning liquid such as acetone and drawing a sheet of lens tissue across the mirror surface with a downward pull. If the mirror surface to be cleaned is recessed within its mounting structure, such an operation becomes quite difficult.

In many such systems it is also important that the axis or axes about which the mirror is rotated during adjustment lie in the plane of the reflective surface of the mirror at the point where the reflection of light occurs. Unless this is true, angular adjustment of the mirror will not only change the angle of the reflected light but will also cause translational motion of the impinged portion of the mirror surface, thus changing the path length traversed by the light, and in some cases shifting the lateral position of the reflected beam. However, if the two mutually orthogonal axes about which the mirror is rotated lie in the plane of the reflecting surface of the mirror and have their intersection at the point of impingement by the beam, then pure angular rotation occurs, without translational motion.

One type of mirror mounting arrangement which has been utilized in the past supports the mirror by means of a pair of orthogonally arranged gimbals to permit independent angular adjustment of the mirror about two corresponding mutually orthogonal axes in the reflective surface of the mirror. However, undesirable complications ensue when one attempts to use such a gimbal mount in a manner permitting adjustment of the mirror angle from the exterior of an enclosure housing the mirror. Such arrangements also tend to be relatively unstable mechanically, particularly in response to severe accelerations or shocks, and the mirror is typically rather difficult to remove and replace in its original location; it is also typically recessed in a position where simple cleaning operations are difficult to perform.

Accordingly, it is an object of the invention to provide a new and useful mirror assembly.

Another object is to provide such an assembly which enables accurate adjustment of the angular position of the mirror.

Another object of the invention is to provide such a mirror support assembly which enables adjustment of the angular position of the mirror about mutually orthogonal axes lying in the plane of the reflective surface of the mirror and intersecting at the point of impingement of light thereon.

A further object is to provide such a mirror assembly which permits the mirror to be readily mounted in, and demounted from, a position within a light enclosure and to be adjusted in angular position from the exterior of the enclosure when the mirror is mounted therewithin.

It is also an object to provide such a mirror assembly which is of high-mechanical stability, particularly in response to rapid accelerations or shocks.

It is also an object to provide such a mirror assembly which includes an integral module structure with respect to which the mirror can be adjusted angularly, which module can be removed as a unit from the light enclosure and, when so removed, exposes the reflective surface of the mirror in an nonrecessed accessible position suitable for easy cleaning thereof.

SUMMARY OF THE INVENTION

These and other objects of the invention are achieved by the provision of mirror means having a reflective surface and trunnion means positioned behind the mirror means to which the mirror means is secured, the trunnion means having side surfaces which lie along a spherical surface having its center in the plane of the reflective surface of the mirror means; also employed are bearing means having spherical bearing surfaces parallel to, and in sliding engagement with, the side surfaces of the trunnion means, and resilient means urging together the trunnion means and the bearing means to maintain the side surfaces of the trunnion means in contact with the bearing surfaces, together with means for rotating the trunnion means with respect to the bearing means about said center as said side surfaces and said bearing surfaces slide over each other. Rotation of the trunnion means then causes the mirror to rotate angularly about the center of the spherical surface in the plane of the reflective surface of the mirror, as desired.

A light-impervious cap preferably encloses the trunnion and the side surfaces of the mirror means, as well as to aid in keeping the mirror clean. In the preferred form the means for rotating the trunnion means comprises a rearward extension of the trunnion means, together with means for adjustably positioning the rearward extension rotationally with respect to said center of said spherical surface, preferably by means of variably positionable means such as set screws extending through the cap along two mutually orthogonal directions and bearing against the sides of the extension at points spaced by 90° around the extension. By adjustment of the set screws, the mirror can be tilted adjustably about two mutually orthogonal axes in the plane of the reflective mirror surface.

The resilient means for urging together the side surfaces of the trunnion means and the bearing surfaces is preferably a wave spring positioned between a capture ring secured to said cap and a shoulder on the trunnion, all of the foregoing elements of the assembly preferably being secured together as an integral modular unit which can be removably mounted upon a base plate on a corner support having an opening for receiving the mirror, so that when the module is mounted on the corner support the opening is closed to light and the mirror front surface is exposed to the light beam to be reflected. Preferably the front surface of the mirror is positioned forwardly of the remainder of the mirror module, so that the mirror can be easily cleaned when the module is removed.

The assembly therefore provides for external control of the angular position of a mirror within an enclosure, about two mutually orthogonal axes lying in the plane of the reflective surface of the mirror, which arrangement is highly stable mechanically, can easily be removed and replaced, and provides for ready cleaning of the mirror when the assembly is removed from the corner support.

BRIEF DESCRIPTION OF FIGURES

These and other objects and features of the invention will become more readily understood from the consideration of the following detailed description, taken in connection with the accompanying drawings, in which:

FIG. 1 is an elevational view, partly broken away, showing a mirror assembly mounted on a corner support, and constructed in accordance with the invention;

FIG. 2 is a plan view of the assembly of FIG. 1;

FIG. 1A is an exploded perspective view of the mirror assembly of FIG. 1;

FIG. 3 is an enlarged sectional view taken along lines 3—3 of FIG. 2;

FIG. 4 is a sectional view taken along lines 4—4 of FIG. 1;

DETAILED DESCRIPTION OF SPECIFIC EMBODIMENTS

Figure 5:
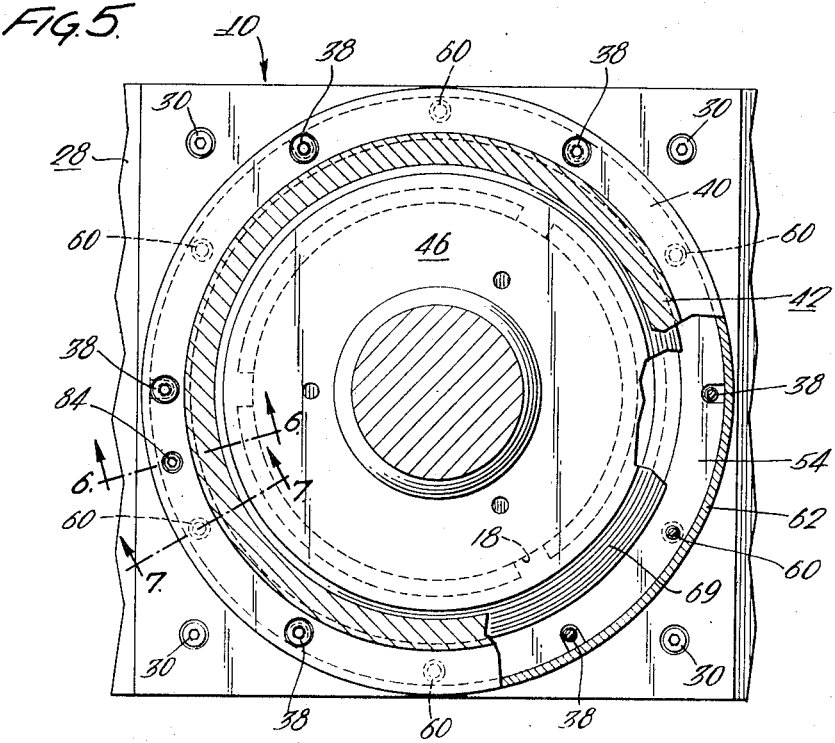
FIG. 5 is a sectional view taken along lines 5—5 of FIG. 3.

Referring now by way of example only to the particular embodiment of the invention illustrated in the drawings, showing a mirror support assembly suitable for use in reflecting a laser or other light beam, the corner support 10 comprises a pair of hollow tubular members 12, 14 having their axes disposed at right angles to each other and intersecting at a point P. The incident beam of electromagnetic radiation 16, this example assumed to be a highly collimated laser beam, passes along the axis of tubular member 12, and strikes the front surface of mirror 18 at the point P, which surface is at 45° to the incident beam thereby to produce a reflected laser beam 20 traveling at right angles to the incident beam and along the axis of the tubular member 14. Corner support 10 also comprises a boxlike corner chamber 22 on which the tubular members 12 and 14 are supported in light-sealed fashion. The general shape of the corner chamber 22 is that of a square box the rear portion of which has been cut off a plane at 45° to the laser beam, thereby to provide a rear opening bounded by peripheral mounting surfaces such as 26. A baseplate 28 of rectangular form is secured to the latter mounting surfaces by means of screws such as 30. Baseplate 28 is provided with a large circular opening 32 for receiving mirror 18, with appropriate ample clearance.

The mirror 18 is supported on an integral mirror support module 34 (see especially FIG. 1A), which is readily mounted on and demounted from the base plate 28 by means of the screws such as 38 which extend through a peripheral flange 40 on the surrounding module cap 42.

The mirror 18 may be of any well-known type utilized for laser beam reflection in which the reflective surface is the front surface of the mirror. The mirror 18 is mounted on the flat front face of a mirror trunnion 46, in this example by means of three spring clips 48 of generally U-shape, each having one leg extending into a narrow peripheral slot 50 in the side of the mirror trunnion and the other leg extending over the edge of the front surface of the mirror. The trunnion 46 is preferably of a hard, heat-conductive material such as aluminum, and if desired a heat-transmissive viscuous layer of material may be applied between the mirror and the trunnion to assure good heat transfer from the mirror to the trunnion in applications where the laser beam is such as to produce substantial heating of the mirror.

Figure 8:
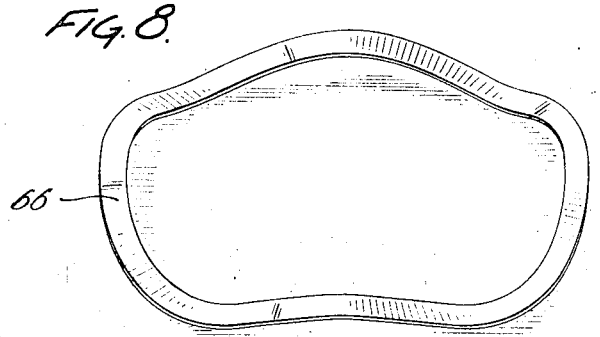
FIG. 8 is a perspective view of a wave spring utilized in the embodiment of the invention shown in the preceding figures.

The module 34 includes a capture ring 54 having an inner forwardly extending flange 56 which fits closely within the corresponding opening in the baseplate 28 so as to provide accurate seating of the module on the baseplate. The capture ring is held to the cap 42 by means of screws such as 60, and fits closely against a surrounding shoulder 62 of the cap. The trunnion 46 is provided with a peripheral shoulder 64 facing toward the mirror, and a circular wave spring 66 (see especially FIG. 8) is positioned between the capture ring 54 and the trunnion shoulder 64, the spring being of such configuration that when the screws 60 are tightened and the trunnion is in the position shown, the spring is partially compressed, e.g., compressed by one-half of its range of compression. The trunnion 46 is provided with peripheral side surfaces 69 which lie along a spherical surface, the center of which is the point P at which the beam is reflected from the front of the mirror. In this example, these side surfaces comprise surfaces such as would be produced by the cutting of a sphere by a pair of parallel planes, and thus may be described as the surfaces of a truncated sphere.

The cap 42 is provided with interior bearing surfaces 70 which have substantially the same form as that of the spherical side surfaces of the trunnion 46. Accordingly, the latter bearing surfaces are spherical about the point P, therefore being parallel to the trunnion side surfaces. By the action of the wave spring 66, the spherical trunnion side surfaces are biased against the bearing surfaces 70 in cap 42, and because of the spherical concentric nature of the bearing surfaces and the trunnion side surfaces, the trunnion can be tilted angularly about the point P, with a sliding motion of the trunnion side surfaces over the adjacent bearing surfaces 70.

To facilitate such tilting of the mirror trunnion, the trunnion is provided with a rearward extension 74, in the form of a rod of square cross section in this example, and the cap 42 is provided with means for rotating the rearward extension 74 about the center P. In this example, these means constitute the four setscrews 76, 78, 80 and 82 extending through the walls of the cap 42, and having crowned ends which bear against the extension 74 at points spaced from each other by 90° around the extension, as shown particularly clearly in FIG. 4. By backing off any one of the setscrews and advancing the opposite setscrew, the desired accurate angular positioning of the mirror can be effected. The longitudinal axes of the adjusting screws are tangent to the continued (projected) trunnion spherical surface having its center at point P. Preferably the axes of one opposite pair of set screws 78, 82 lie in the plane of the incident and reflected beams 16, 20 and the axes of the other setscrews 76 and 80 lie in a plane at right angles to the latter two planes. With this arrangement of setscrews, independent adjustment can be provided about a pair of mutually orthogonal axes intersecting at point P and lying in the plane of the reflective surface of the mirror 18.

It will be understood, however, that the particular means utilized to vary the angular position of the trunnion may depart substantially from the setscrew arrangement shown, and may comprise for example any of a variety of precision vernier positioning devices, manually or automatically controlled, and may in some cases include apparatus for varying the angle of the trunnion, and hence of the mirror, for the purpose of providing slight scanning of the reflected beam during operation.

Figure 6:
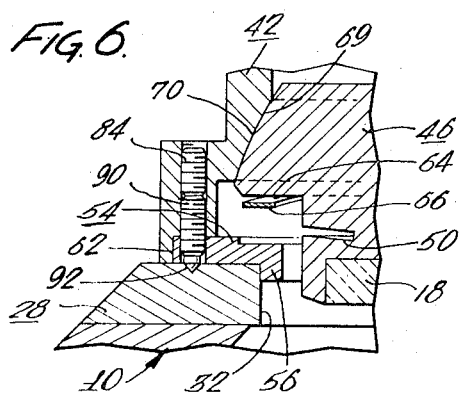
FIG. 6 is a fragmentary sectional view taken along lines 6—6 of FIG. 5.
Figure 7:
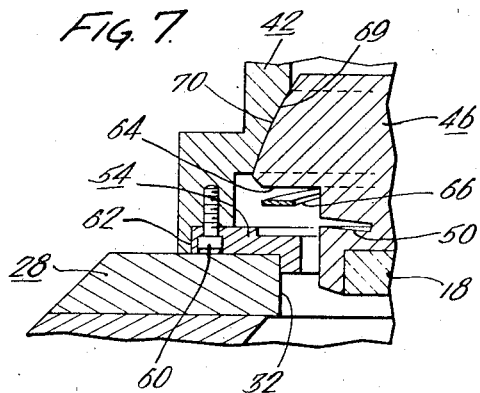
FIG. 7 is a fragmentary sectional view taken along lines 7—7 of FIG. 5.

Referring particularly now to FIG. 1A, in assembling the device the module 34 is first assembled, which may be accomplished as follows. The setscrews 76, 78, 80 and 82 are retracted just sufficiently to accommodate the extension 74, the mirror 18 is clipped on to the front of the trunnion 46 by means of the spring clips 48, the trunnion is dropped carefully into the cap 42 so that the extension 74 positions itself generally as indicated in FIG. 4, the wave spring 66 is positioned about the front of the trunnion, and the capture ring 54 is screwed on to the front of the assembly to provide slight, but not excessive, pressure between the spherical trunnion surfaces and the spherical bearing surfaces of the cap. The baseplate 28 is screwed into position over the rear opening of the corner chamber 22 of the corner support 10, and the module 34 positioned on the baseplate. To assure proper angular position of the module at this time, an indexing pin 90 (see also FIG. 6) is preferably provided near the periphery of the cap 42, the pin having a conical point extending forwardly so as to engage in the corresponding recess 92 in the base plate when the module is in its desired rotational position. Another setscrew 84 may be screwed into the cap behind and against the index pin 90 to lock it into position. The screws 38 may then be tightened to hold the module in position on the corner support. The setscrews 76, 78, 80 and 82 may then be adjusted until the desired alignment of the reflected laser beam 20 is obtained. Where any subsequent readjustments are necessary, the module need not be removed or disassembled, but the setscrews are merely adjusted from the exterior of the cap 42. When it is desired to clean the mirror, it is only necessary to remove the module 34 by loosening the screws 38 and then to clean the front surface of the mirror in any conventional manner, the latter surface extending forwardly of the remainder of the module so as to facilitate such cleaning. The module may then be replaced as described in connection with its initial installation, without upsetting the angular adjustment of the mirror.

Even with relatively coarse setscrews for adjusting the mirror angle, the apparatus shown can readily provide a 3° range of adjustment of the mirror position, with a resolution of approximately 60 minutes of arc per revolution. The use of finer threads of the setscrews, or the use of differential screw drives or other precision vernier arrangements, will provide a considerably greater accuracy of adjustment.

It is also noted that the mirror trunnion is held against translational motion in one direction by the relatively firm wave spring 66, is positively held against translational motion in all other directions by the support provided by the spherical bearing surfaces 70 on the interior of the cap 42, and is positively held in its angularly adjusted position by the setscrews 76, 78, 80 and 82. Accordingly, the assembly also possesses a high degree of stability, particularly in the presence of rapid accelerations or shocks.

Accordingly, while the invention has been described with particular reference to specific embodiments in the interest of complete definiteness, it will be understood that it may be embodied in a wide variety of forms diverse from those specifically shown and described, without departing from the scope and spirit of the invention as defined by the appended claims.

What is claimed is:
1. A mirror assembly, comprising:
mirror means having a reflective surface;
trunnion means positioned behind said mirror means, and means securing said mirror means to said trunnion means;
said trunnion means having side surfaces which lie along a spherical surface having its center in the plane of said reflective surface;
bearing means having spherical bearing surfaces parallel to, and in sliding engagement with, said side surfaces of said trunnion means;
resilient means urging together said trunnion means and said bearing means to maintain said side surfaces in contact with said bearing surfaces; and
means for rotating said trunnion means, with respect to said bearing means, about said center as said side surfaces and said bearing surfaces slide over each other, said means for rotating said trunnion means comprising a rearward extension of said trunnion means and means for adjustably positioning said rearward extension rotationally with respect to said center of said spherical surface.

2. The assembly of claim 1, comprising a cap extending over and around said rearward extension of said trunnion, and said means adjustably positioning said rearward extension comprises variably positionable means extending through said cap and bearing against the sides of said extension.

3. The assembly of claim 2, in which said variably positionable means comprise four elements bearing against the sides of said extension at points 90° apart from each other about said extension.

4. A laser mirror-corner assembly, comprising:
a laser mirror having a plane reflective front surface;
a mirror trunnion, and means mounting said mirror on the front face of said trunnion so that said front surface of said mirror is positioned forwardly of said trunnion;
said trunnion having circumferential side surfaces which are in the form of a segment of a sphere having its center at the center of said front surface of said mirror and having a rearwardly extending extension;
a trunnion cap enclosing the rear of said trunnion and said side surfaces thereof;
said trunnion cap having internal bearing surfaces of spherical form extending parallel to, and in sliding engagement with, said side surfaces;
a capture ring secured to said cap forwardly of said side surfaces;
a wave spring positioned between said ring and said cap;
a circumferential shoulder on said trunnion positioned partially to compress said spring between said shoulder and said ring, thereby to urge said side surfaces against said bearing surfaces while permitting at least limited rotation of said trunnion with respect to said bearing;
adjustable screw means extending through said cap along two mutually perpendicular directions and bearing against said trunnion extension to permit adjustment of the rotational position of said trunnion and said mirror by adjustment of said screw means;
said mirror, said trunnion, said cap, said ring and said spring, when secured together, constituting an integral module;
a corner support comprising a pair of hollow tubular members the axes of which intersect each other at said center of said mirror front surface, for passing the incident and reflected laser beam;
a baseplate mounted on said corner support at 45° to said axes and provided with an opening for receiving said mirror when said module is secured to said baseplate; and
means for removably securing said module to said baseplate to close said opening and expose said mirror front surface to said laser beam.

5. The assembly of claim 4, in which said screw means comprise four screws contacting said trunnion extension at points spaced from each other by 90° about said extension.

* * * * *